(12) United States Patent
Sasikumar et al.

(10) Patent No.: US 10,460,483 B2
(45) Date of Patent: Oct. 29, 2019

(54) TOOL FOR CREATING AND EDITING ARCS

(71) Applicant: Adobe Inc., San Jose, CA (US)

(72) Inventors: Anirudh Sasikumar, Dublin, CA (US); Tomas Krcha, San Francisco, CA (US); Narciso Batacan Jaramillo, Piedmont, CA (US); Talin Chris Wadsworth, Castro Valley, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/982,984

(22) Filed: May 17, 2018

(65) Prior Publication Data

US 2018/0268576 A1 Sep. 20, 2018

Related U.S. Application Data

(63) Continuation of application No. 15/247,608, filed on Aug. 25, 2016, now Pat. No. 10,008,014.

(51) Int. Cl.
| | |
|---|---|
| *G06T 11/20* | (2006.01) |
| *G06F 3/0482* | (2013.01) |
| *G06F 3/0484* | (2013.01) |
| *G06T 3/40* | (2006.01) |
| *G06T 5/00* | (2006.01) |
| G06F 3/0481 | (2013.01) |

(52) U.S. Cl.
CPC .......... *G06T 11/203* (2013.01); *G06F 3/0482* (2013.01); *G06F 3/04845* (2013.01); *G06T 3/40* (2013.01); *G06T 5/002* (2013.01); *G06F 3/04817* (2013.01)

(58) Field of Classification Search
CPC .......................... G06T 11/203; G06F 3/04845
See application file for complete search history.

(56) References Cited

U.S. PATENT DOCUMENTS

| | | | |
|---|---|---|---|
| 6,268,871 B1 | 7/2001 | Rice et al. | |
| 6,441,822 B1 | 8/2002 | Johnson | |
| 6,628,285 B1 | 9/2003 | Abeyta et al. | |

(Continued)

OTHER PUBLICATIONS

"Inkscape: Guide to a Vector Drawing Program—Ellipses, Circles, and Arcs." Tavmjong Bah. pp. 1-2. Jan. 2, 2007. Accessed via web @ http://tavmjong.free.fr/INKSCAPE/MANUAL/html/Shapes-Arcs.htnnl on Mar. 11, 2019. (Year: 2007).*

(Continued)

*Primary Examiner* — Antonio A Caschera
(74) *Attorney, Agent, or Firm* — SBMC

(57) ABSTRACT

A tool is provided via a user interface for a digital media application that supports digital illustrations. The tool combines operations to create different types of segments for a drawing shape and covert between types of segments. The tool is configured to analyze the drawing to recognize segments that are straight, arc, or curved portions of the drawing path. For segments recognized as curved, the segments are represented as Bezier curve segments. For segments recognized as straight, the segments are represented as line segments. Additionally, line segments are associated with handle elements operable to convert the line segments to regular arc segments. Responsive to manipulation of a handle element for a particular line segment, the tool computes a corresponding regular arc and converts the line segment into a regular arc segment.

20 Claims, 12 Drawing Sheets

(56) References Cited

U.S. PATENT DOCUMENTS

| | | |
|---|---|---|
| 9,396,566 B2 | 7/2016 | Pedreira et al. |
| 10,008,014 B2 | 6/2018 | Sasikumar et al. |
| 2011/0285724 A1 | 11/2011 | Kilgard |
| 2014/0375655 A1 | 12/2014 | Gou |
| 2018/0061092 A1 | 3/2018 | Sasikumar et al. |

OTHER PUBLICATIONS

"Microugly—a Quick Guide to Inkscape", Retrieved from <https://web.archive.org/web/20070517174151/www.microugly.com/inkscape-quickguide/>, Dec. 26, 2017, 12 pages.

"Notice of Allowance", U.S. Appl. No. 15/247,608, dated Feb. 23, 2018, 10 pages.

"Pre-Interview Communication", U.S. Appl. No. 15/247,608, dated Dec. 26, 2017, 4 pages.

"Supplemental Notice of Allowance", U.S. Appl. No. 15/247,608, dated Apr. 9, 2018, 4 pages.

* cited by examiner

TOOL FOR CREATING AND EDITING ARCS

RELATED APPLICATIONS

This Application claims priority as a continuation of U.S. patent application Ser. No. 15/247,608, filed Aug. 25, 2016, and titled "Tool for Creating and Editing Arcs," the entire disclosure of which is hereby incorporated by reference.

BACKGROUND

Today, individuals frequently use digital media applications to create and edit content, produce artwork and visual designs, generate user interface designs (UX) and web documents, and otherwise author work product. In connection with content creation, users may employ various tools provided by the digital media applications design to facilitate the creation process. For example, a toolbar or menu of available operations may be exposed in connection with a digital illustration or graphics editing program. Options made available via such programs may include various tools operable to draw shapes, lines, and arcs.

In conventional approaches, different operations are associated with separate tools that do not integrate well with each other. For example, separate selectable icons as part of modern iconography, menu items, or other controls may be provided for drawing a line, drawing an arc, creating a rectangle, and so forth. In this approach, the user has to manually operate different controls to switch back and forth between operations in order to form a path having different types of segments, e.g., curved and arc, which may make it especially difficult when later trying to edit these different types of segments. This takes additional time and distracts the user from creation of the project.

Additionally, conventional techniques used to form arcs may also present additional challenges to users when forming arcs. Conventional arc tools define curved paths using Bezier curves. However, conventional arc tools define these Bezier curves as standalone segments in which each segment is defined independently along a path. This makes it difficult for a user to draw regular arc segments that fit in with the rest of a path. This is especially difficult when the path is curved due to lack of synchronization of transitions between curved segments in the path in conventional techniques. In another conventional example, conventional pen tools are used to draw arcs through precise location of control points responsive to user inputs, which may be difficult for an end-user to perform. Further, conventional pen tools do not preserve the arc properties when the path is edited. Thus, any later attempt by the user to edit this arc is not able to leverage this definition as an arc. Accordingly, connection of arcs with other shapes in conventional techniques is difficult using existing tools and does not integrate well between different types of shapes and tools. Consequently, the process of creating complex shapes having arcs is manually intensive and implemented through a disconnected user experience.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

Techniques are described herein for an arc tool that may be used to form arcs and straight lines without manually switching between tools. In implementations, the tool is generated via a user interface for a digital media application that supports digital illustrations. The tool combines operations to create different types of segments for a drawing shape and convert between the different types of segments into a single tool. For example, to produce a shape a user may trace a drawing path on a drawing canvas using a mouse, touch input, or other input mechanism. With the tool active, points along the path are identified and translated into a series of segments that are connected one to another, and thus may do so without manually switching between arc and pen tools. Different types of segments may be represented depending upon the shape of the input path.

Rather than using different tools for different types of segments, the tool is configured to analyze the drawing to recognize and distinguish between segments that are straight or curved portions of the drawing path. For segments recognized as curved, the segments are represented as Bezier curve segments, which are parametric curves used to model paths with scalability. For segments recognized as straight, the segments are represented as line segments on the drawing canvas. Additionally, line segments are associated with respective handle elements (or other functionality) operable to convert the line segments to regular arc segments. Responsive to manipulation of a handle element for a particular line segment, the tool operates to compute a corresponding regular arc and convert the particular line segment into a regular arc segment. Accordingly, the tool enables operations to selectively draw lines, Bezier curves, and regular arcs through a single tool and without switching back and forth between separate tools.

For example, upon user selection of a straight segment (e.g., a line selected via a "click") of a path, the computing device may place a handle to appear at an approximate middle location of the segment. User inputs may subsequently be received through interaction with this handle to convert that straight segment (i.e., a straight line) into a segment having an arc. The handle may also be configured by the computing device to move freely across the arc, with its distance from two anchor points disposed at opposite ends of the segment used to define the radius and length of the arc. In this way, an end user may efficiently create and/or adjust an arc as desired through use of these combined tools and even convert segments to different types, e.g., straight to arc and vice versa.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
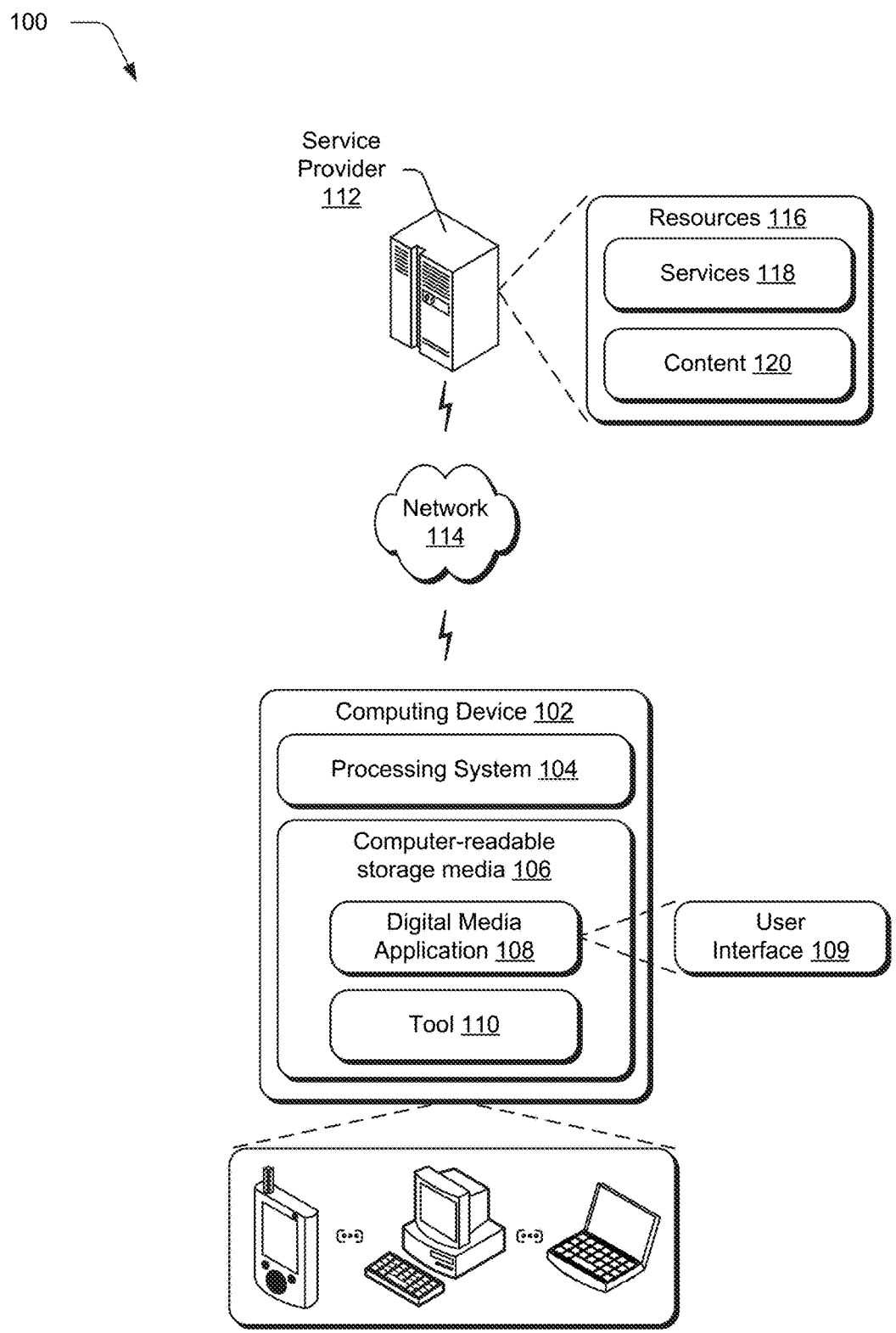
FIG. 1 is an illustration of an example operating operable to employ techniques described herein.

In conventional approaches, different drawing operations used to create digital illustrations are associated with separate tools. For example, separate selectable icons, menu items, or other controls may be provided for drawing a line, drawing an arc, creating a rectangle, and so forth. In this approach, the user has to manually operate different controls to switch back and forth between operations, which takes additional time and distracts the user from creation of the project. Consequently, the process of creating complex shapes having arcs is manually intensive and implemented may give the impression of a disconnected user experience.

Techniques are described herein for a tool in which a single tool is configured to address different types of segments (e.g., arc and straight) in a path, e.g., within a user interface. In implementations, the tool is generated via a user interface for a digital media application that supports digital illustrations. Examples of such applications include Adobe Illustrator® and Adobe Experience Design®, which support vector graphics editing and other digital illustration techniques for content creation. The tool combines, in a single tool, operations to create different types of segments for drawing shapes and convert between different types of segments, e.g., arc and straight. In one example, handles are used in straight-line segments to enable these segments to be converted to arcs and editing of the arcs. In another example, to produce a shape a user may trace a drawing path on a drawing canvas using a mouse, touch input, or other input mechanism. With the tool active, points along the path are identified and translated into a series of segments that are connected one to another. Different types of segments may be represented depending upon the shape of the path that is input.

Rather than using multiple different tools for different types of segments (e.g., a line tool, an arc tool, a pen tool, etc.), the tool is configured to analyze the drawing to recognize and distinguish between segments. For instance, the tool may identify portions of a drawing path that are straight or curved portions. For segments recognized as curved, the segments are represented as Bezier curve segments. Bezier curves are parametric curves useful for modeling paths with scalability. For segments recognized as straight, the segments are represented as line segments on the drawing canvas. Additionally, line segments are associated with respective handle elements (or other functionality) operable to convert the line segments to regular arc segments. Responsive to manipulation of a handle element for a particular line segment, the tool operates to compute a corresponding regular arc and convert the particular line segment into a regular arc segment. Accordingly, the tool enables operations to selectively draw lines, Bezier curves, and regular arcs through a single tool and without switching back and forth between separate tools. Different types of segments are joined together to form a shape. In implementations, the shapes are vector graphic shapes that may be resized and repositioned proportionally. The digital media application may be used to create multiple shapes and combine the shapes together to produce a digital illustration.

Techniques for a tool as described in this document enable users who produce creative content to easily and quickly design shapes and incorporate the shapes into their content. For example, digital icons that use different types of arcs, lines, and curves may be created using the tool and without the user having to constantly switch back and forth between tools using a tool bar or other tool selector. Consequently, the user is able to focus on content creation and does not have to expend undue time and energy to manually locate different tools or remember what particular functions different tools provide.

In the following discussion, an example environment is first described that may employ the techniques described herein. Example implementation details and procedures are then described which may be performed in the example environment as well as other environments. Consequently, performance of the example procedures and details is not limited to the example environment and the example environment is not limited to performance of the examples procedures and details.

Example Environment

FIG. 1 is an illustration of an environment 100 in an example implementation that is operable to employ techniques described herein. The illustrated environment 100 includes a computing device 102 having a processing system 104 that may include one or more processing devices, one or more computer-readable storage media 106 and a digital media application 108 embodied on the computer-readable storage media 106. The digital media application 108 is operable via the processing system 104 to implement corresponding functionality described herein. The digital media application 108 may represent a desktop application that supports digital illustrations and graphic design. To do so, the digital media application 108 may expose a drawing canvas and different tools operable to create different shapes and content. In implementations, the digital media application 108 further provides integrated functionality to create content with digital illustrations, visual designs for content, user interface designs (UX), web documents, and other work product. The integrated functionality is accessible via a user interface 109 exposed by the digital media application 108 having various tools, elements, controls, menus, pages and other features to facilitate creation and editing of visual design. The digital media application 108 may also include functionality operable to access various kinds of web-based resources (e.g., content and services) to facilitate creation of content and access to download web content for inclusion in a design. The digital media application 108 may also represent a client-side component operable to interact with online providers to access "cloud-based" resources and applications, such as being a browser or network-enabled application configured to interact with web services and web content available from a service provide to implement aspects of the techniques described above and below. In implementations, the digital media application 108 represents an integrated vector graphics editing application, one example of which is Adobe Experience Design®.

The computing device 102 may also include or make use of a tool 110 that represents functionality operable to implement aspects of the techniques described above and below. As noted above, the tool 110 combines functionality traditionally associated with multiple different tools to make it easier and quicker for users to create shapes and integrate the shapes into their designs. In particular, the tool 110 enables operations to selectively draw lines, Bezier curves, and regular arcs through a single tool and without switching back and forth between separate tools. Details regarding these and other aspects of the tool 110 are discussed in relation to the following figures.

The computing device 102 may be configured as any suitable type of computing device. For example, the computing device may be configured as a desktop computer, a laptop computer, a mobile device (e.g., assuming a handheld configuration such as a tablet or mobile phone), a tablet, and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices to perform operations "over the cloud" as further described in relation to FIG. 12

The environment 100 further depicts one or more service providers 112, configured to communicate with computing device 102 over a network 114, such as the Internet, to provide a "cloud-based" computing environment. Generally, speaking a service provider 112 is configured to make various resources 116 available over the network 114 to clients. In some scenarios, users may sign-up for accounts that are employed to access corresponding resources from a provider. The provider may authenticate credentials of a user (e.g., username and password) before granting access to an account and corresponding resources 116. Other resources 116 may be made freely available, (e.g., without authentication or account-based access). The resources 116 can include any suitable combination of services 118 and/or content 120 typically made available over a network by one or more providers. Some examples of services 118 include, but are not limited to, a digital illustration service, an online suite of applications, photo editing service, a web development and management service, a collaboration service, a social networking service, a messaging service, an advertisement service, and so forth. Content 120 may include various combinations of text, video, ads, audio, multi-media streams, animations, images, web documents, web pages, applications, device applications, and the like.

Having considered an example environment, consider now a discussion of some example details of tool techniques in accordance with one or more implementations.

Tool Implementation Details

This section describes some example details of a tool in accordance with one or more implementations. The details are discussed in relation to some example scenarios, user interfaces, and procedures, of FIGS. 2-11. The procedures discussed below are represented as sets of blocks that specify operations performed by one or more devices and are not necessarily limited to the orders shown for performing the operations by the respective blocks. Aspects of the procedures may be implemented in hardware, firmware, or software, or a combination thereof. Some aspects of the procedures may be implemented via one or more servers, such as via a service provider 112 that maintains and provides access to resources 116, services 118, and content 120. Aspects of the procedures may also be performed by a suitably configured device, such as the example computing device 102 of FIG. 1 that includes or makes use of a tool 110 and/or a digital media application 108.

In general, functionality, features, and concepts described in relation to the examples above and below may be employed in the context of the example procedures described in this document. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Figure 2:
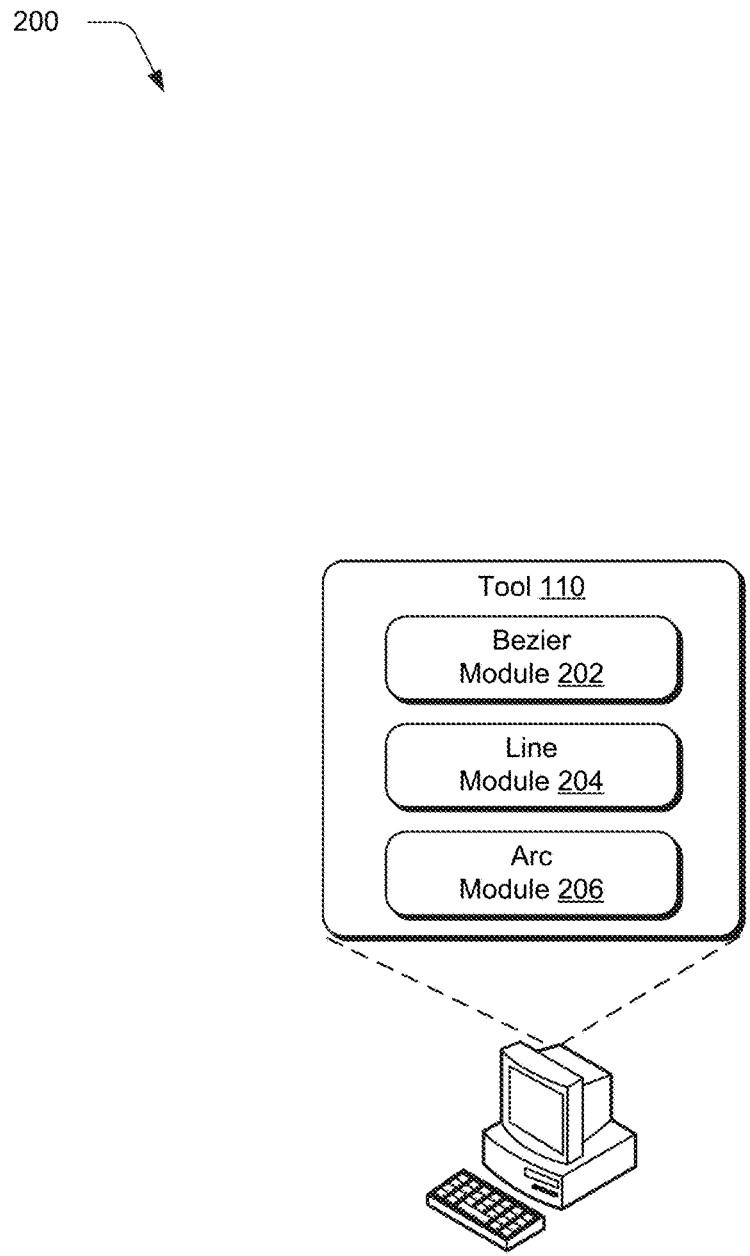
FIG. 2 depicts an example implementation of a tool of FIG. 1 shown in greater detail in accordance with one or more implementations.

FIG. 2 depicts an example implementation 200 of the tool 110 of FIG. 1 shown in greater detail. The tool 110 is generally configured to facilitate creation of shapes within a drawing or other visual document design using different types of segments. In implementations, the tool 110 may be implemented to produce objects that combine lines, curves, and arcs. Multiple distinct segments are joined together at endpoints to form shapes which may be open or closed shapes. Closed shapes may be filled on the interior with colors and/or patterns. Shapes may be resized, repositioned and otherwise manipulated as a whole while preserving the shape and without disassociation of the different segments. Segments of a shape may also be edited individually. Additionally, tool 110 implements functionality as described herein to selectively draw lines, Bezier curves, and regular arcs through a single tool and without switching back and forth between separate tools.

The tool 110 may be implemented as a software module, a hardware device, or using a combination of software, hardware, firmware, fixed logic circuitry, etc. The tool 110 may be implemented as a standalone component of a computing device 102 or alternatively as a component of the digital media application 108, an operating system, or other device application. By way of example and not limitation, the tool 110 in the example of FIG. 2 includes a Bezier module 202, line module 204, and arc module 206 that operate as described herein.

To produce a shape, a user may activate the tool 110 by selecting the tool from a tool bar, a menu, or other tool selection instrumentality. A mouse, touch input, or other input mechanism may be employed to draw a path on a drawing canvas with the tool active. Points along the path are identified and translated into a series of segments that are connected one to another. Different types of segments may be recognized and represented depending upon the shape of the input path. In this context, the Bezier module 202, line module 204, and arc module 206 represent functionality integrated with the tool 110 for handling of Bezier curve, lines, and regular arcs respectively. The handling includes operations to analyze the path to detect points along the path, map points to different types of segments based on the path shape, divide the path into one or more segments, calculate representations of the segments, and output the representations via the drawing canvas.

For instance, the Bezier module 202, and line module 204 enable the tool 110 to recognize and distinguish between segments that are straight or curved portions of the drawing path. For segments recognized as curved, the segments are represented as Bezier curve segments, which are parametric curves used to model paths with scalability. For segments recognized as straight, the segments are represented as line segments on the drawing canvas. Additionally, arc module 206 operates to detect line segments and associate the segments with respective handle elements (or other functionality) operable to convert the line segments to regular arc segments. The tool also invokes the arc module 206 to compute regular arcs for line segments and convert the line segments into regular arc segments responsive to manipulation of a handle elements. Thus, rather than using different tools for different types of segments, the tool is designed to combine functionality to handle straight or curved portions of a drawing path and to make conversions between different types of segments, as discussed herein.

Figure 3:
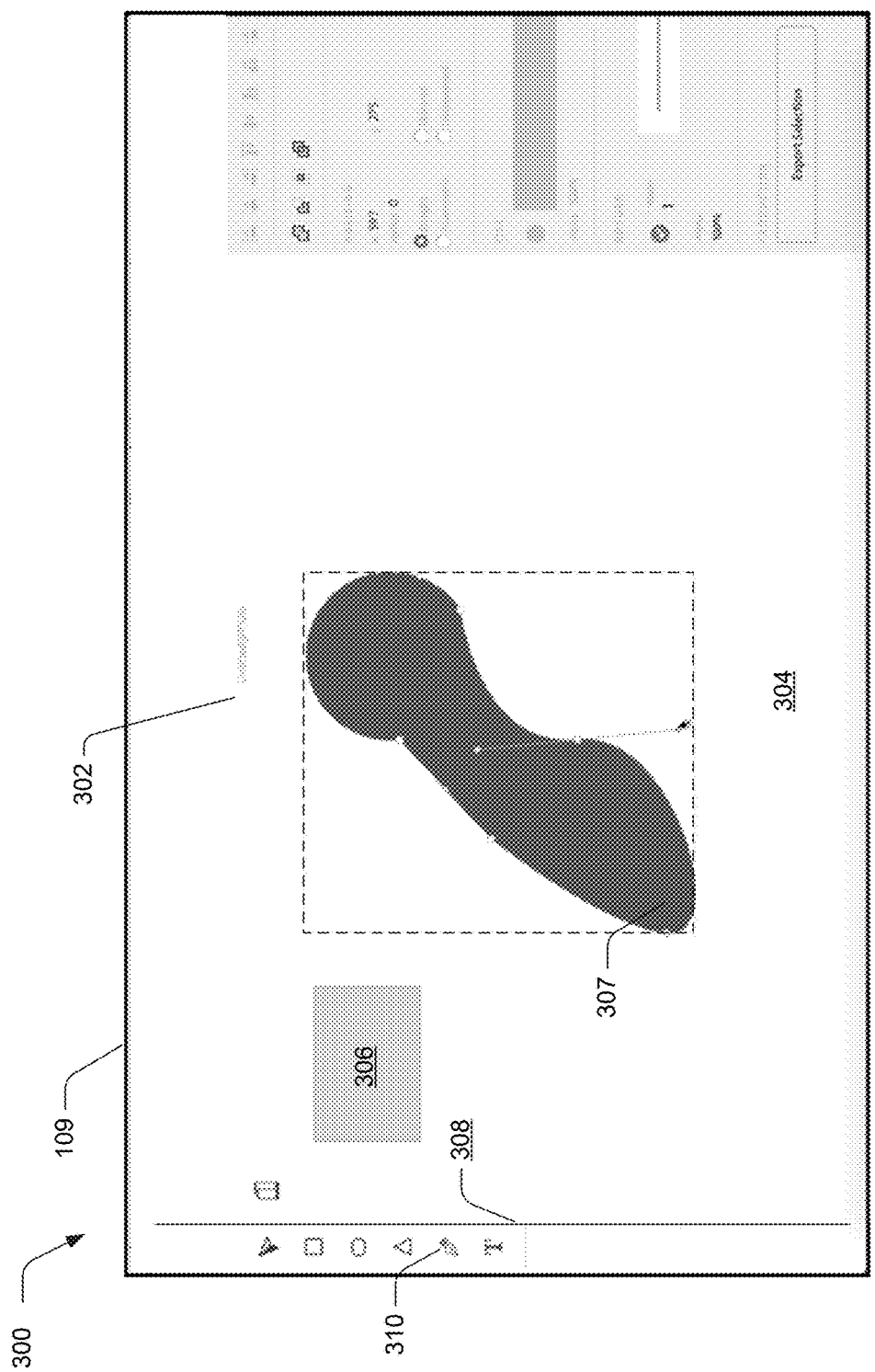
FIG. 3 depicts an example implementation of a user interface for a digital media application in accordance with one or more implementations.

To further illustrate, FIG. 3 depicts generally at 300 an example implementation of a user interface 109 for a digital media application 108 in accordance with one or more implementations. The example user interface 109 includes a display pane 302 in which various drawings, document previews, windows, toolbars, menus, controls, icons, UI panels, and the like may be displayed to facilitate creation and editing. In accordance with techniques described herein, the user interface 109 provides a variety of functionality and features to facilitate creation of content and digital illustrations.

By way of example, the display pane 302 of FIG. 3 includes an editing pane 304 that presents a document or drawing canvas for the visual design being created and/or edited via the user interface 109. A drawing canvas exposed in the editing pane 304 provides a document, page, or container for creating a digital illustration. For example, different functionality available via the user interface 109 may be selected and used to add design elements such as shapes, text, pen lines, on the digital canvas, manipulate the elements, add colors and effects, and so forth. Example shapes shown in FIG. 3 include a rectangular polygon 306 and a vector graphics shape 307 that may be drawn (via a pen tool or otherwise) as a collection of segments (lines and curves) that are connected one to another.

The display pane 302 additionally includes a tool bar 308 that represents a set of controls exposed via the user interface 109 to provide access to different functionality for content creation and editing provide via the digital media application 108. In this example, the tool bar 308 provide icons for multiple tools that are selectable to perform different drawing operations for digital illustration on the drawing canvas exposed via the editing pane 304. The tool bar 308 includes a control 310 associated with a tool 110. The control 310 is operable to select and activate the tool 110 to produce shapes formed as a collection of segments as described above and below.

Figure 4:
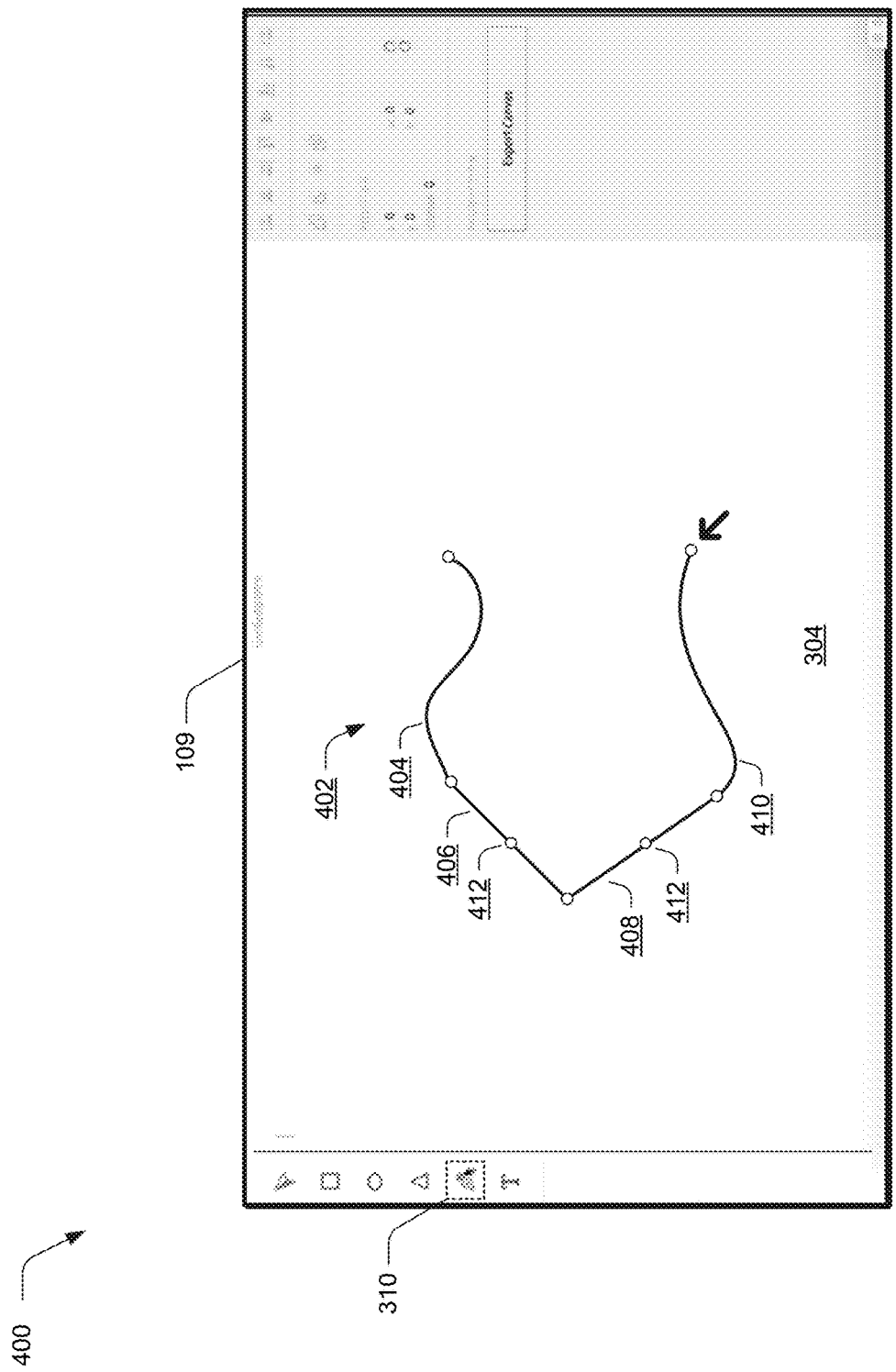
FIG. 4 depicts creation of a drawing path via a user interface using a tool in accordance with one or more implementations.

Consider now the example of FIG. 4, which depicts generally at 400 creation of a drawing path 402 via a user interface 109 using a tool 110 in accordance with one or more implementations. As illustrated in FIG. 4, the tool 110 is selected and activated by way of a corresponding control 310. To produce the drawing path 402, a user provides input to manipulate a cursor position. Movement of the cursor is tracked to define a plurality of points that create the path on the drawing canvas. Traces or strokes (e.g., digital lines) are laid down to represent the drawing path 402 as specified by the input. For example, a "click-drag" may be used to create a curved point, movement of a cursor control device (e.g., mouse, trackpad) may be used to change the location of the next end point to be placed, a single selection (e.g., "clicking") without dragging creates a straight anchor in which a new handle appears in the middle of a segment which when dragged converts straight segments into arcs, and so forth. As noted, a drawing path and corresponding shape may be formed as a collection of segments. The collection of segments may include lines and curves. Segments are connected one to another at endpoints of the segments. Endpoints may be formed at the beginning and ending of different discrete interactions to draw on the canvas. In the depicted example, the drawing path 402 is formed by a Bezier curve segment 404 connected to a line 406, connected to another line 408, and then connected to another Bezier curve 410. Additionally, functionality to manipulate the line segments and convert the line segments into arcs is exposed in relation to the lines segments. In this example, the functionality is illustrated as handle elements 412 that are displayed along with line segments. In an implementation, the handle elements 412 are arranged at midpoints of the line segments and operable by dragging across the drawing canvas to convert the line segments to regular arc segments. Other techniques to initiate conversions are also contemplated such as by clicks on the handles, using menu selections, via a gesture such as a swipe gesture, and so on. Further details regarding creation of a drawing path 402 via a user interface 109 using a tool 110 are discussed with reference to the example procedure of FIG. 5.

Figure 5:
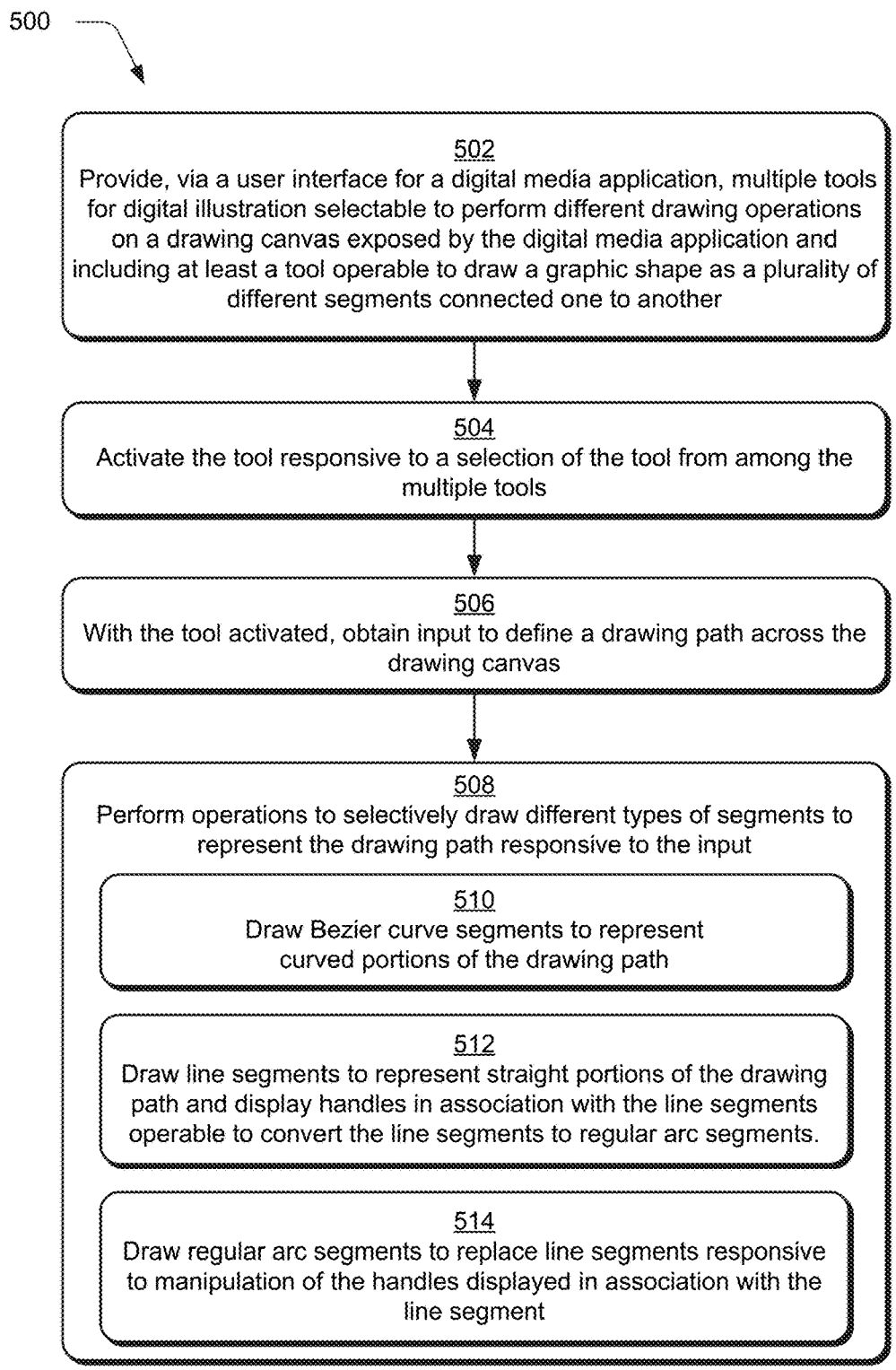
FIG. 5 depicts an example procedure for selectively drawing segments via a tool in accordance with one or more implementations.

In particular, FIG. 5 depicts an example procedure 500 for selectively drawing segments via a tool in accordance with one or more implementations. Multiple tools for digital illustration are provided via a user interface for a digital media application, the tools selectable to perform different drawing operations on a drawing canvas exposed by the digital media application and including at least a tool operable to draw a graphic shape as a plurality of different segments connected one to another (block 502). For example, a user interface 109 as previously described may be configured to provide access to a tool 110 as well as various other tools designed to facilitate digital illustration. In one or more implementations, the multiple tools are provided via a tool bar 308 exposed by the user interface 109. As discussed, the tool bar 308 may include a plurality of icons selectable to activate different tools of the multiple tools at different times. Other ways to access different tools are also contemplated, such as through menus, keystroke shortcuts, gestures, voice commands, and so forth. Different tools may be employed to produce shapes and combine different shapes to create a digital illustration. In an implementation, the digital media application is configured as a vector graphics editing application in which case the shapes may be formed as vector graphics shapes.

The tool activated responsive to a selection of the tool from among the multiple tools (block 504). For example, a control 310 associated with a tool 110 as represented in FIG.

3 and FIG. 4 may be selected from a toolbar or otherwise. The control 310 may be a selectable icon as illustrated or other suitable control operable to switch between different types of drawing tools and functions, such as a menu item or toggle switch.

With the tool activated, input is obtained to define a drawing path across the drawing canvas (block 506) and operations are performed to selectively draw different types of segments to represent the drawing path responsive to the input (block 508). In particular, selection of the control 310 causes activation of the tool 110 and drawing operations are then control under the influence of the tool 110. Mouse input, button clicks, and other inputs may be received, processed, and handled via the tool 110 to draw paths as noted above. The tool 110 maintains control over the drawing operations until a different tool is selected or the tool 110 is otherwise deactivated.

While activated, the tool 110 operates to selectively draw different types of segments to represent the drawing path responsive to the input. As noted, the tool 110 may determine whether to draw lines, curves or arcs in dependence upon the shape, point locations, and other characteristics of a drawing path. The operations to selectively draw different types of segments occur without switching to a different one of the multiple tools. In other words, the tool 110 remains active as the different kinds of segments are formed.

The tool 110 performs analysis of the drawing path to recognize and distinguish between different segments of a path. For example, one or more segments may be recognized as being straight portions or curved portions of the drawing path by examining the shape to the path, position of points along the path, start and stop points, and other characteristics of the path and input used to create the path. In this context, operations to selectively draw different types of segments may include drawing Bezier curve segments to represent curved portions of the drawing path block 510), drawing line segments to represent straight portions of the drawing path and displaying handles in association with the line segments operable to convert the line segments to regular arc segments (block 512), and drawing regular arc segments to replace line segments responsive to manipulation of the handles displayed in association with the line segments (block 514).

Thus, based on analysis of a drawing path, the tool 110 operates to selectively present line segments and Bezier curve segments to represent the path. Line segments are automatically associated with handles or other functionality operable to convert the segments to arcs. In implementation, handles are displayed at midpoint of the line segments. The handles may be selectively shown when a user is editing a path and hidden at other times to enable the user to view the path/illustration. Handles displayed in association with the line segments may be configured as drag controls that may be manipulated using a mouse, touch input, stylus, or other cursor control input.

Generally, the drag controls or other handles are movable outward from paths for the line segment to form corresponding regular arc segments. The handles are movable outward in any direction and freely along arc paths formed responsive to manipulation of the handles. Moving a handle into different positions relative to the midpoint of the corresponding line segment forms arcs of different sizes.

In particular, the radii and lengths of regular arc segments formed using the handles are controlled based on distance of the drag controls from endpoints of the regular arc segments. Moving a handle along the arc from the midpoint closer to an endpoint increases the radius. In implementations, movement of the handle on the arced path formed between endpoints is constrained by tolerance areas defined around the endpoints. This controls the radius of the regular arc segment within a designated range. Otherwise, the radius may expand up to very large values with the handle at or near the endpoints and may create an undesirable visual appearance. By way of example and not limitation, handle movement may be constrained by tolerance areas defined around the endpoints of five to ten percent of the segment length.

Additional operations may be made available via the tool 110 to manipulate segments and paths. For example, once a segment is converted to a regular arc segment, the handle may be used to drag the arc back into a line or change the arc. In an implementation, designated interaction with the handle, such as a double-click, may also be used to convert the regular arc segment into a Bezier curve segment. The arc nature of a segment is preserved to the extent possible once the regular arc segment is created. For instance, the arc may be modified by selecting and moving the handle or the endpoints. Resizing of a shape proportionally preserves regular arc segments included in the shape as regular arcs by resizing of the radii and lengths proportionally. If resizing is non-uniform, though, regular arc segments are converted to Bezier curve segment to enable stretching or squashing of the arc non-uniformly in accordance with the resizing Additional details and examples regarding these and other aspects of a tool 110 are discussed below in relation to scenarios and procedure of FIGS. 6 to 11.

Figure 6:
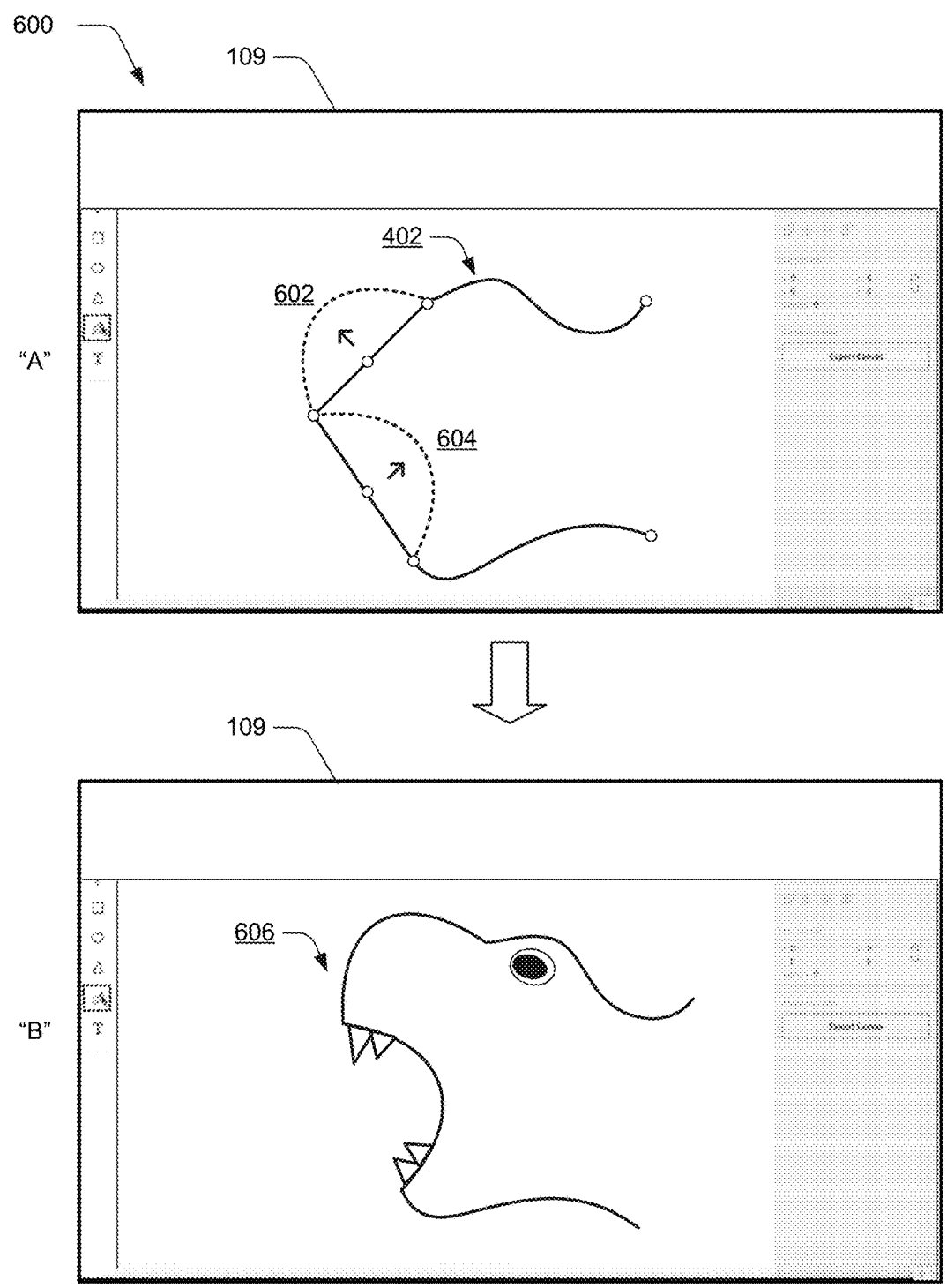
FIG. 6 is a diagram depicting a scenario in which a digital illustration is created using a tool in accordance with one or more implementations.

For instance, FIG. 6 is a diagram depicting generally at 600 a scenario in which a digital illustration is created using a tool in accordance with one or more implementations. The example scenarios described herein are each depicted as a sequence of views of a user interface 109 labeled using different letters. In particular, view "A" of FIG. 6 represents a user interface 109 having the drawing path 402 as discussed in relation to FIG. 4. As noted, the drawing path 402 is created using a tool 110 to form segments as lines or curves. Any line segments are associated with handles that may be dragged or otherwise manipulated to form corresponding regular arcs. For example, line segments in the example of FIG. 6 are represented with handles (e.g., drag controls) placed at midpoints of the segments. The arrows and dashed arcs at 602 and 604 represent manipulation of the handles that may occur to form corresponding regular arcs. Here, the handles are dragged outward away from the path of the line segments to generate arcs. View "B" represents a drawing path 606 that is created by the manipulation of the handles as indicated at 602 and 604. In this example, some simple details such as eyes and teeth have been added to the drawing path 606 to create an illustration of a dinosaur. As may be appreciated, the process of creating an illustration such as the example dinosaur using the tool 110 is quick and easy. The drawing path 402 is created with a few simple strokes/input commands and then modified using the handles. The details are added and the digital illustration begins to take recognizable form as shown in view "B".

Figure 7:
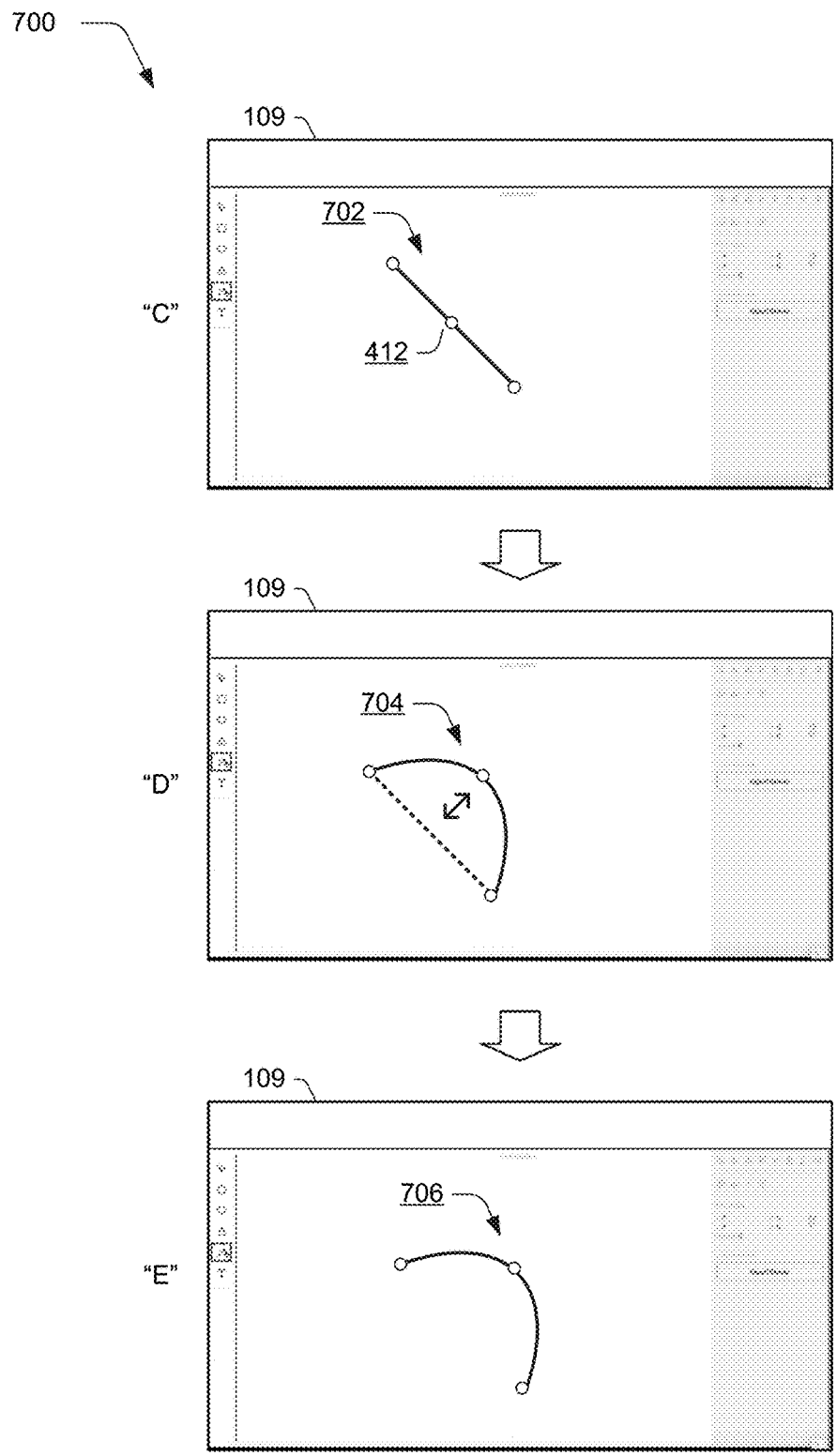
FIG. 7 is a diagram depicting a scenario in which a tool is used to convert between lines and regular arcs in accordance with one or more implementations.

FIG. 7 is a diagram depicting a scenario 700 in which a tool is used to convert between lines and regular arcs in accordance with one or more implementations. In particular, view "C" of FIG. 7 represents a user interface 109 having an example line segment 702 with a handle element 412 as discussed in relation to FIG. 4. View "D" represents manipulation 704 of the handle element 412 to form a corresponding regular arc segment. For example, the handle element 412 may be dragged back and forth to set a position away from the line. When the handle element 412 is initially manipulated, the line segment is converted to a regular arc segment. Further manipulation results in resizing of the regular arc segment in accordance with the position selected for the handle element 412. View "D" represents a regular arc segment 706 that is formed as a result of the manipulation 704.

Figure 8:
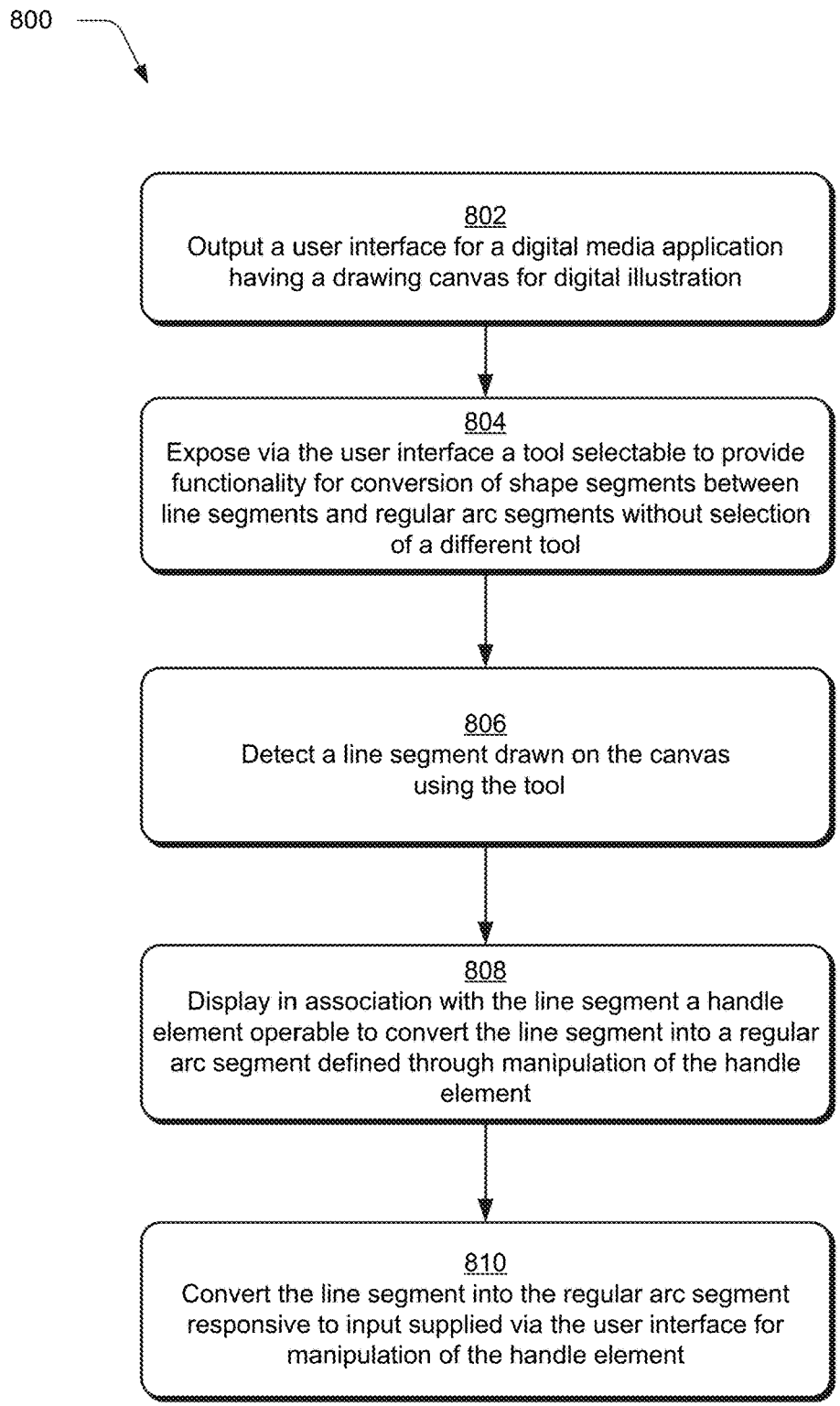
FIG. 8 depicts an example procedure for conversion between lines and regular arcs using a tool in accordance with one or more implementations.

FIG. 8 depicts an example procedure 800 for conversion between lines and regular arcs using a tool in accordance with one or more implementations. A user interface is output having a drawing canvas for digital illustrations (block 802). For instance, a user interface 109 may be provided for a digital media application 108 as discussed previously. The user interface 109 may include a drawing canvas that may be used to create digital illustrations using various tools and functionality available via the digital media application 108.

A tool is exposed via the user interface that is selectable to provide functionality for conversion of shape segments between line segments and regular segments without selection of a different tool (block 804). The user interface 109 may expose a tool 110 in various ways. In an implementation, the tool 110 is included as one of multiple tools available via a tool bar 308. The tool 110 may also be accessible via a menu, using a keystroke, or otherwise.

A line segment drawn on the canvas using the tool is detected (block 806) and a handle element operable to convert the line segment into a regular arc segment defined through manipulation of the handle element is displayed in association with the line segment (block 808). Then, the line segment is converted into a regular arc segment responsive to input supplied via the user interface for manipulation of the handle element (block 810.) When a drawing path is created, the tool 110 operates to analyze and recognize segments as being straight portions or curved portions of the drawing path. Then, segments recognized as curved portions are represented as Bezier curve segments and segments recognized as straight portions are represented as line segments. Line segments associated with drawing paths are associated with handle elements 412, examples of which were previously shown and discussed in relation to FIG. 4, FIG. 6, and FIG. 7. In implementations, handle elements 412 are positioned at a midpoint of the line segment between endpoints of the line segment. The handle elements 412 are movable to different positions by dragging of the handle element outward from the line segment. A handle element may also travel along an arced path(s) formed between the endpoints as the handle element is dragged into different positions. Manipulation of the handle element creates a regular arc segment that correspond to the line segment.

Figure 9:
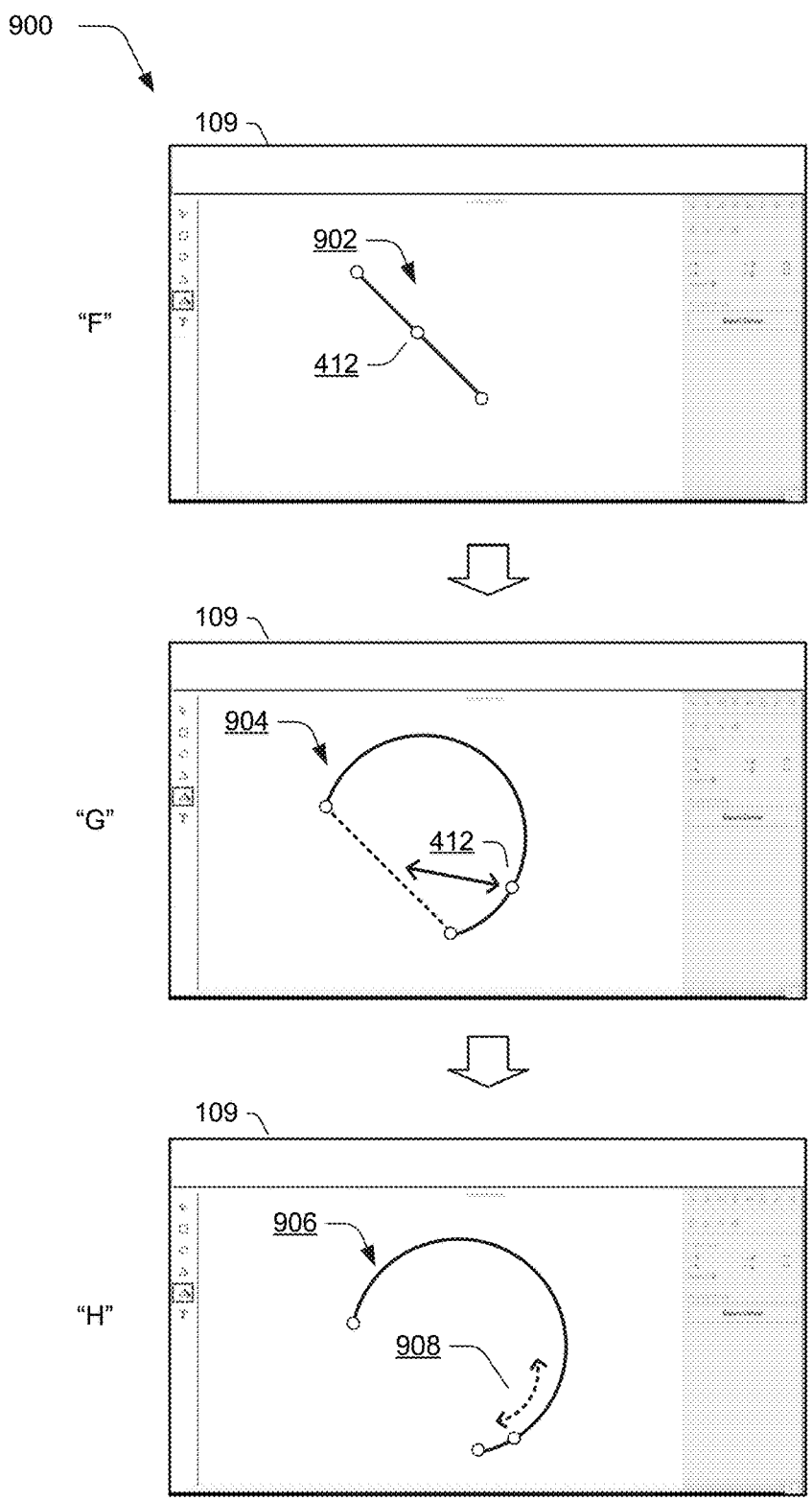
FIG. 9 is a diagram depicting a scenario showing details of creating a regular arc segment using a tool in accordance with one or more implementations.

FIG. 9 is a diagram depicting a scenario 900 showing details of creating a regular arc segment using a tool in accordance with one or more implementations. In particular, view "F" of FIG. 9 represents a user interface 109 having an example line segment 902 with a handle element 412 as discussed in relation to FIG. 4. View "G" represents dragging of the handle element outward from the line segment into different positions. Note that while the previous example of FIG. 7 represents movement of a handle perpendicular to the line segment, handle elements are movable in any direction. By way of example, the handle element 412 in view "G" is moved outward at an angle towards the lower right of the user interface to form the regular arc segment 904. Additionally, view "H" represents a regular arc segment 906 that is formed by movement 908 of the handle element 412 along the path of the arc. Due to the movement 908 along the path, the regular arc segment 906 has a larger radius in comparison to the regular arc segment 904. As noted previously, handle movement along the path may be constrained by tolerance areas defined around segment endpoints.

Figure 10:
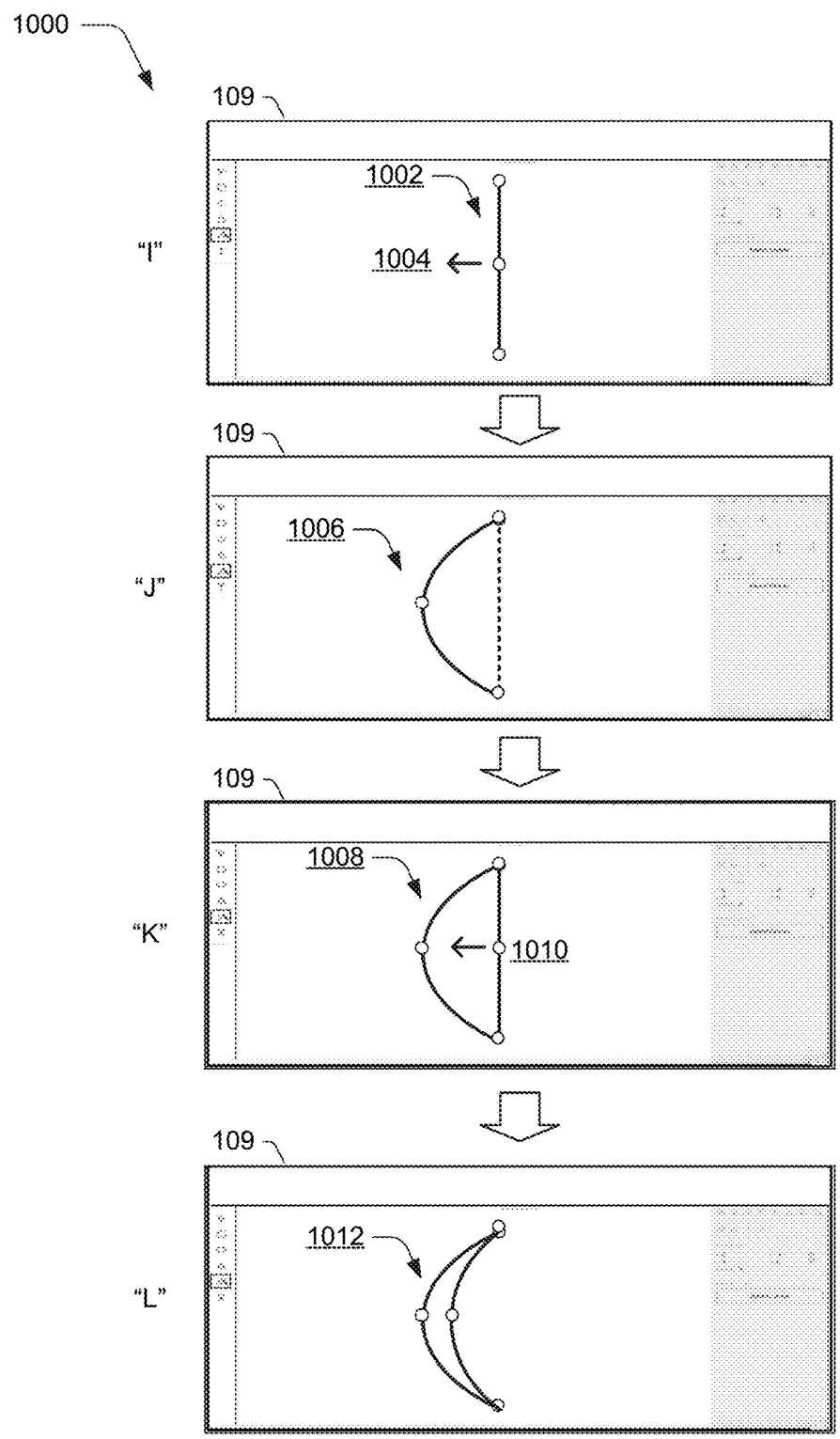
FIG. 10 is a diagram depicting a scenario showing details of creating a shape using a tool in accordance with one or more implementations.

FIG. 10 is a diagram depicting a scenario 1000 showing details of creating a shape using a tool in accordance with one or more implementations. In this example, a crescent moon shape is created quickly and easily using the tool 110 and techniques described herein. To do so, the tool 110 is selected and a line segment 1002 is drawn as shown in view "I". Then, a handle element is manipulated as represented at 1004. The manipulation at 1004 produces a regular arc segment 1006 as represented in view "J". In view "K", an intermediate shape 1008 is formed by drawing another line segment between endpoints of the regular arc segment 1006 of view "J". A handle element is then manipulated as represented at 1010. The manipulation at 1010 converts the line to another regular arc segment and produces the crescent moon shape 1012 as represented in view "L". Accordingly, shapes such as the crescent moon shape 1012 can be created in just a few steps using the tool 110 and without having to switch between different tools.

Figure 11:
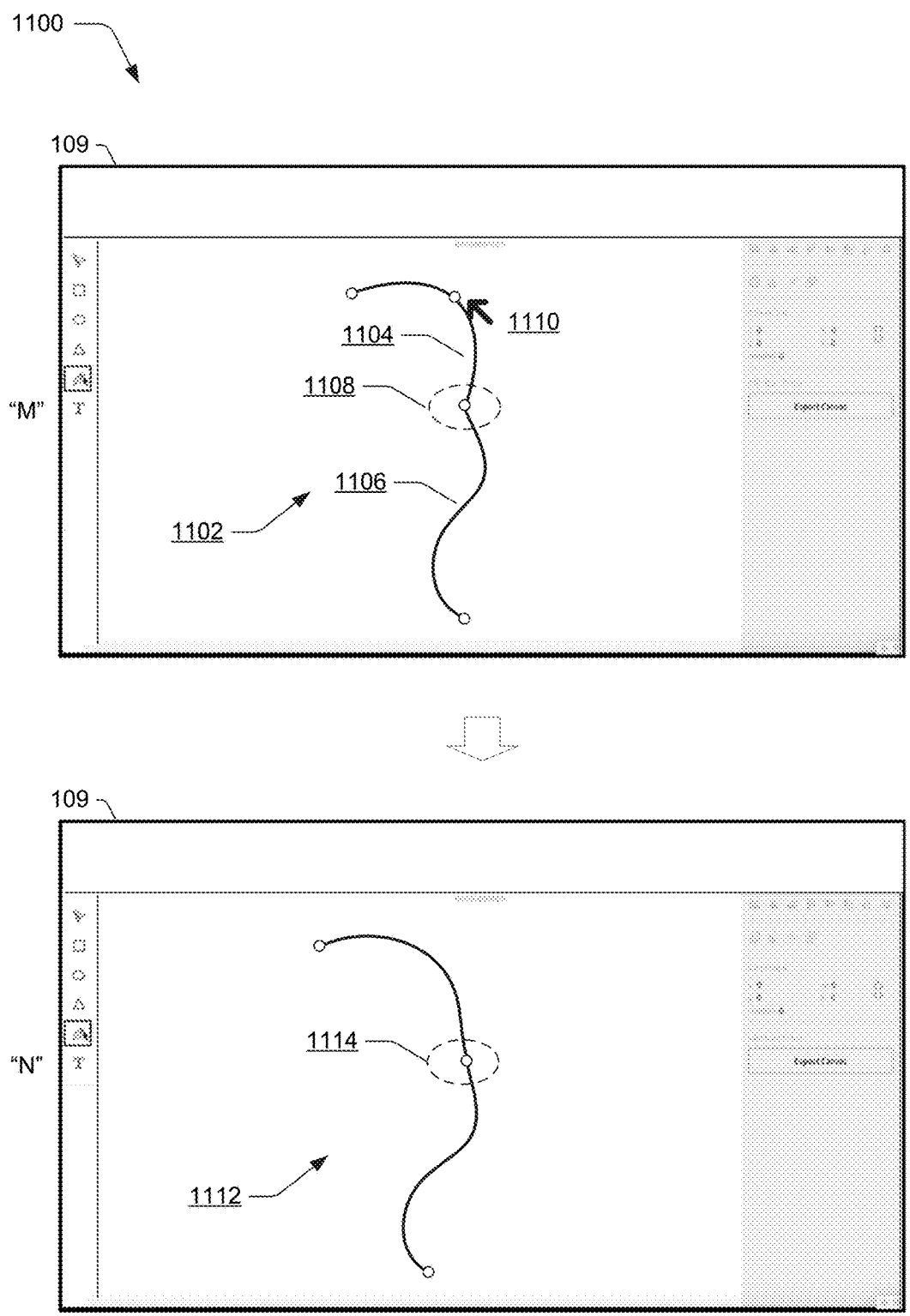
FIG. 11 is a diagram depicting a scenario in which transition between different segment types are smoothed in accordance with one or more implementations.

FIG. 11 is a diagram depicting a scenario 1100 in which transition between different segment types are smoothed in accordance with one or more implementations. The tool 110 may be further configured to provide an option for smoothing transition points between segments. In some cases, connection points between lines, curves and arcs may appear kinked. To correct this, the tool 110 may implement a smoothing technique. By way of example, consider view "M" which depicts a user interface 109 having an example drawing path 1102. The drawing path 1102 includes a regular arc segment 1104 connected to a Bezier curve segment 1106 at a connection point 1108. Notice that the drawing path 1102 appears kinked at the connection point 1108. In implementations, an action may be defined that when triggered causes application of a smoothing algorithm to connection point to smooth the transition between segments. In one approach, the action is triggered by a selection of the particular connection point such as through clicking, double-clicking, and so forth. The selection may also occur through a segment selection, such as selection of a regular arc segment connected to a Bezier curve segment, or vice versa. In the example of FIG. 11, a selection 1110 is shown, which in this case is a selection of the regular arc segment 1104 by double-clicking on the handle element at the midpoint.

In responsive to an appropriate selection, a smoothing algorithm is applied to the path at the connection point. In general, the smoothing algorithm is designed to match curvature of segments around the connection point using a selected continuity level (e.g., G1, G2, G3, etc.). In implementations, the smoothing algorithm is configured to convert regular arc segments to Bezier curve segments in order to enable the curvature matching. View "N" represents a modified drawing path 1112 that results following the selection 1110 and application of the smoothing algorithm. Notice that the path has been smoothed at the connection point 1114. Additionally, the regular arc segment 1104 has been converted to another Bezier curve segment.

Tool Implementation Example:

A tool 110 may be implemented in various ways in accordance with the principles and examples discussed in this document. It is expected that the tool 110 may be altered to suit different scenarios and tune the system. Such alterations may include variation to tuning parameters and underlying mathematical algorithms to suit different scenarios. Accordingly, details discussed in this section are intended as an illustrative example of the parameters, algorithms, and considerations that may be used to design a tool with recognition that different designs may employ different approaches.

As new points are placed with a tool 110 to draw curved paths or when a path is being edited, each segment is examined to determine if it is a straight line or curve. If a straight segment is detected, a handle element is drawn as previously noted. Selection of the handle element converts that segment to a regular arc segment and enables modification of the arc through manipulation of the handle element In one or more implementations, arcs are represented as follows using elliptical arc syntax as defined according to standard Scalable Vector Graphics (SVG) specifications:

rx, and ry are the radii of the ellipse (semi-major and semi-minor axes)

xAngle is angle from x-axis of the current coordinate system to the x axis of ellipse largeArc is 0 if an arc spanning less than or equal to 180 degrees is chosen, or 1 if an arc spanning greater than 180 is chosen.

sweep is 0 if line joining center to arc sweeps through decreasing angles, 1 if it sweeps through increasing angles.

x0, y0 is start point and x1, y1 is end point of arc segment

Given two endpoints of a segment x0, y0 and x1, y1 and a cursor position on a handle hx, hy, processing to implement a tool 110 may occur in the following manner
1. Compute midpoint m0 between line drawn from x0, y0 and hx, hy.
2. Compute midpoint m1 between line drawn from x1, y1 and hx, hy.
3. Compute perpendicular bisectors from m0 and m1 and find intersection between those two bisectors at cx, cy.
4. Distance from cx, cy to x0, y0 gives rx, ry for arc representation.
5. Compute sweep:
   a. v3=v1(x1, y1)−v0(x0, y0)
   b. Get angle a2 of v3 by computing arctangent.
   c. v4=v2(hx, hy)−v0(x0, y0)
   d. Rotate v4 by −1*a2.
   e. Get angle a3 of v4 by computing arctangent.
   f. sweep is 1 if a3<=0; 0 otherwise.
6. Compute largeArc:
   a. Compute angle a0 between x0, y0 and cx, cy.
   b. Compute angle a1 between x1, y1 and cx, cy.
   c. d0=a1−a0
   d. largeArc is 1 if d0 is between Pi and −Pi.
7. xAngle is set to 0.

In accordance with the example algorithm above, moving the handle along the arc does not affect the radius or visual appearance of the arc much. A characteristic of the above algorithm is that moving endpoints that are at either the start or end of an arc segment updates the arc so that the curve represented by the arc reduces proportionally to the distance between the endpoints. As noted, resizing a path proportionally allows for preservation of arc segments so a user is still able to the arc using the handle.

Mathematically:
1. (x0, y0), (x1, y1), (hx, hy), (cx, cy) are transformed using the scaling factor (sx, sx)
2. Algorithm described previously is run to compute a new arc segment.

A Bezier path is represented as endpoints and control points. This solution relies on a data structure where arc segments and Bezier curve segments can be mixed together. Arcs are represented using the elliptical arc syntax and can be injected safely at any point in the Bezier path data structure. This allows tooling to differentiate between existing arc segments within a curved path and draw appropriate handles.

Having considered the forgoing example details, procedures, user interfaces and examples, consider now a discussion of an example system including various components and devices that can be employed for one or more implementations of image search techniques described herein.

Example System and Device

Figure 12:
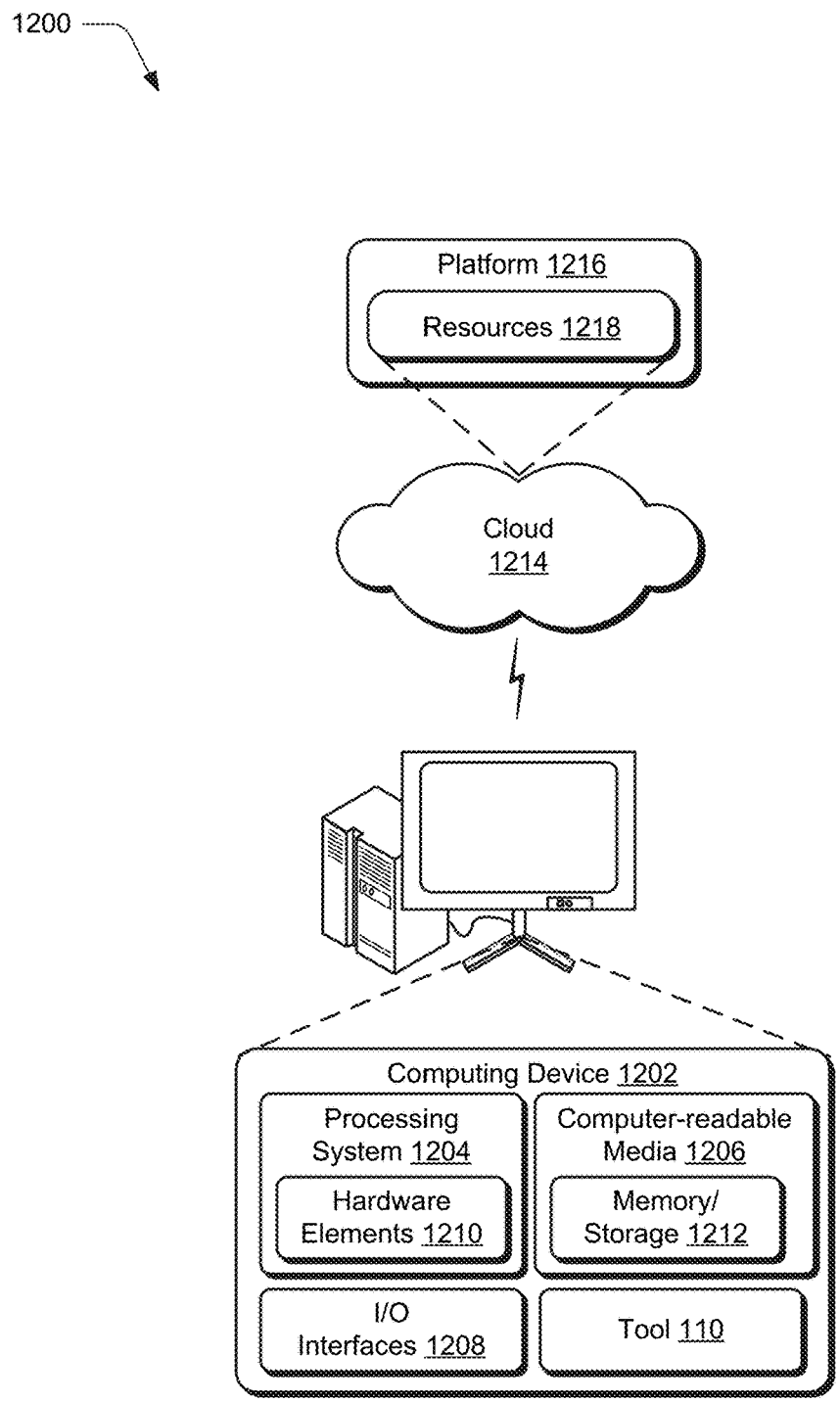
FIG. 12 illustrates an example system including various components of an example device that can be employed for one or more implementations of the techniques described herein.

FIG. 12 illustrates an example system generally at 1200 that includes an example computing device 1202 that is representative of one or more computing systems and/or devices that may implement the various techniques described herein. This is illustrated through inclusion of the tool 110, which operates as described above. The computing device 1202 may be, for example, a server of a service provider, a device associated with a client (e.g., a client device), an on-chip system, and/or any other suitable computing device or computing system.

The example computing device 1202 is illustrated as including a processing system 1204, one or more computer-readable media 1206, and one or more I/O interface 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware elements 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1206 is illustrated as including memory/storage 1212. The memory/storage 1212 represents memory/storage capacity associated with one or more computer-readable media. The memory/storage component 1212 may include volatile media (such as random access memory (RAM)) and/or nonvolatile media (such as read only memory (ROM), Flash memory, optical disks, magnetic disks, and so forth). The memory/storage component 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" refers to media and/or devices that enable persistent and/or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1210 and computer-readable media 1206 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of a module that is executable by the computing device 1202 as software may be achieved at least partially in hardware, e.g., through use of computer-readable storage media and/or hardware elements 1210 of the processing system 1204. The instructions and/or functions may be executable/operable by one or more articles of manufacture (for example, one or more computing devices 1202 and/or processing systems 1204) to implement techniques, modules, and examples described herein.

The techniques described herein may be supported by various configurations of the computing device 1202 and are not limited to the specific examples of the techniques described herein. This functionality may also be implemented all or in part through use of a distributed system, such as over a "cloud" 1214 via a platform 1216 as described below.

The cloud 1214 includes and/or is representative of a platform 1216 for resources 1218. The platform 1216 abstracts underlying functionality of hardware (e.g., servers) and software resources of the cloud 1214. The resources 1218 may include applications and/or data that can be utilized while computer processing is executed on servers that are remote from the computing device 1202. Resources 1218 can also include services provided over the Internet and/or through a subscriber network, such as a cellular or Wi-Fi network.

The platform 1216 may abstract resources and functions to connect the computing device 1202 with other computing devices. The platform 1216 may also serve to abstract scaling of resources to provide a corresponding level of scale to encountered demand for the resources 1218 that are implemented via the platform 1216. Accordingly, in an interconnected device embodiment, implementation of functionality described herein may be distributed throughout the system 1200. For example, the functionality may be implemented in part on the computing device 1202 as well as via the platform 1216 that abstracts the functionality of the cloud 1214.

CONCLUSION

Although techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

What is claimed is:

1. In a digital media environment to facilitate digital illustration creation using a computing device, a method comprising:
   receiving, by the computing device, a first user input specifying a drawing path in a drawing canvas;
   displaying, by the computing device, the drawing path in the drawing canvas as a plurality of segments, the plurality of segments including an arc segment;
   receiving, by the computing device, a second user input via the drawing canvas to resize the displayed drawing path;
   resizing, by the computing device responsive to the second user input, the plurality of segments of the drawing path proportionally, the resizing including scaling the arc segment based on arc radius and arc length; and
   displaying, by the computing device, the resized plurality of segments of the drawing path in the drawing canvas.

2. The method as described in claim 1, wherein the arc segment is generated by drawing the arc segment to replace a respective line segment of the drawing path responsive to manipulation of a handle displayed in association with the line segment.

3. The method as described in claim 2, wherein the handle is movable outward from the line segment to form the arc segment.

4. The method as described in claim 3, wherein the radii and length of the arc segment are controlled based on a distance of the handle from endpoints of the arc segment.

5. The method as described in claim 3, wherein the handle is movable outward from the arc segment in any direction and freely along the arc segment responsive to manipulation of the handle.

6. The method as described in claim 1, wherein the displaying includes drawing a Bezier curve segment to represent a curved portion of the drawing path based on the first user input.

7. The method as described in claim 1, wherein the displaying includes:
   drawing a line segment to represent a straight portion of the drawing path based on the first user input and displaying a handle in association with the line segment operable to convert the line segment to the arc segment; and
   drawing the arc segment to replace the line segment responsive to manipulation of the handle displayed in association with the line segment.

8. The method as described in claim 1, further comprising:
   detecting selection of the arc segment, the arc segment connected at a connection point to a Bezier curve segment of the drawing path; and
   responsive to the detecting, smoothing a transition at the connection point from the arc segment to the Bezier curve segment by applying a smoothing algorithm.

9. The method of claim 8, wherein the smoothing algorithm is configured to convert the arc segment to another Bezier curve segment.

10. In a digital media environment to facilitate digital illustration creation using a computing device, a method comprising:
    receiving, by the computing device, a first user input specifying a drawing path in a drawing canvas;
    displaying, by the computing device, the drawing path in the drawing canvas as a plurality of segments, the plurality of segments including an arc segment;
    receiving, by the computing device, a second user input via the drawing canvas to resize the arc segment;
    converting, by the computing device, the arc segment into a Bezier curve segment;
    resizing, by the computing device, the Bezier curve segment based on the second user input; and
    displaying, by the computing device, the resized Bezier curve segment in the drawing canvas as part of the drawing path.

11. The method as described in claim 10, wherein the resizing is non-uniform and includes stretching the Bezier curve segment.

12. The method as described in claim 10, wherein the resizing is non-uniform and includes squashing the Bezier curve segment.

13. The method as described in claim 10, wherein the arc segment is generated by drawing the arc segment to replace a respective line segment of the drawing path responsive to manipulation of a handle displayed in association with the line segment.

14. The method as described in claim 13, wherein the handle is movable outward from the line segment to form the arc segment.

15. A computing device comprising:
    a processing system;
    a display device; and
    a computer-readable storage medium having instructions stored thereon that, responsive to execution by the processing system, causes the processing system to perform operations comprising:
    displaying a drawing path in a drawing canvas by the display device as including a plurality of segments of the drawing path, the plurality of segments including an arc segment;
    receiving a user input via the drawing canvas to resize the arc segment;
    responsive to determining that the user input specifies proportional resizing, resizing the arc segment based on an arc radius and arc length; and
    responsive to determining that the user input specifies non-uniform resizing, resizing the arc segment by converting the arc segment into a Bezier curve segment and resizing the Bezier curve segment; and
    displaying the resized arc segment of the drawing path in the digital canvas by the display device.

16. The computing device as described in claim 15, wherein the operations include resizing the Bezier curve segment by stretching or squashing the Bezier curve segment.

17. The computing device as described in claim 15, wherein the operations further comprise:
    drawing a line segment as part of the drawing path, the line segment including a handle; and
    responsive to user manipulation of the handle, replacing the line segment with the arc segment.

18. The computing device as described in claim 17, wherein the handle is movable responsive to the user manipulation outward from the line segment to form the arc segment.

19. The computing device as described in claim 18, wherein the radii and length of the arc segment are controlled based on respective distances of the handle from respective endpoints of the arc segment.

20. The computing device as described in claim 15, further comprising:
- detecting selection of the arc segment, the arc segment connected at a connection point to a Bezier curve segment of the drawing path; and
- responsive to the detecting, smoothing a transition at the connection point from the arc segment to the Bezier curve segment by applying a smoothing algorithm.

\* \* \* \* \*